Dec. 10, 1968    M. H. JONES    3,416,155
RECORDING PEN
Filed May 10, 1966    2 Sheets-Sheet 1
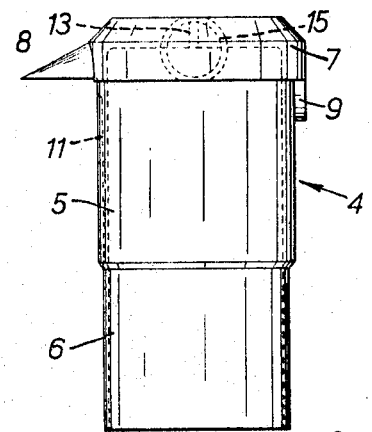
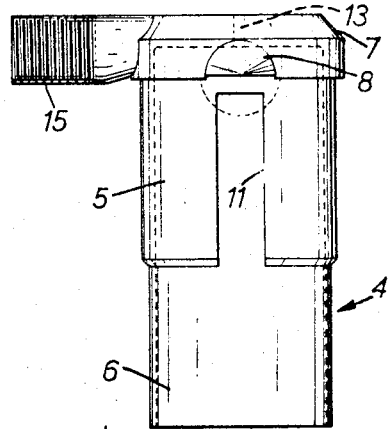
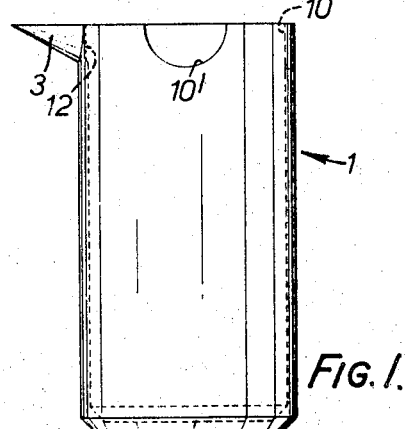
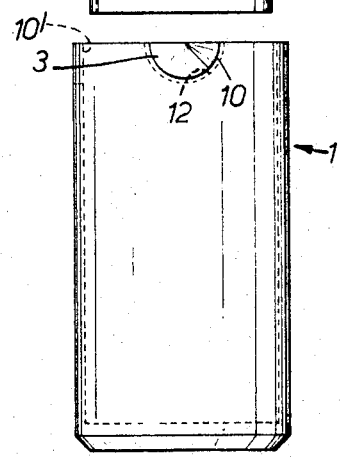
FIG. 1.
FIG. 2.
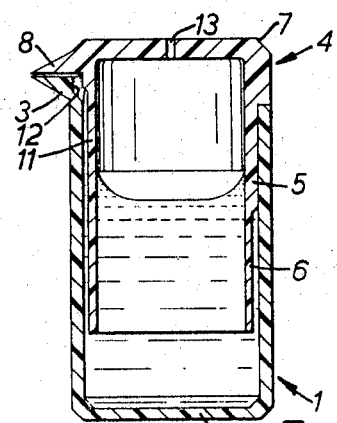
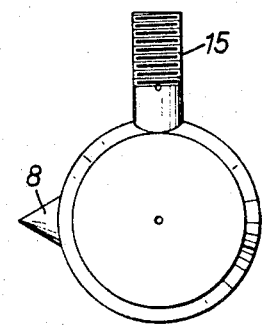
FIG. 3.
FIG. 4.
INVENTOR
MICHAEL HAROLD JONES
BY
Young & Thompson
ATTORNEYS Dec. 10, 1968  M. H. JONES  3,416,155
RECORDING PEN
Filed May 10, 1966  2 Sheets-Sheet 2

INVENTOR
MICHAEL HAROLD JONES
BY Young + Thompson
ATTORNEYS

United States Patent Office 3,416,155
Patented Dec. 10, 1968

3,416,155
RECORDING PEN
Michael Harold Jones, Cheltenham, England, assignor to Walker Crosweller & Company Limited, Clyde Crescent, Cheltenham, England
Filed May 10, 1966, Ser. No. 548,916
Claims priority, application Great Britain, May 29, 1965, 22,936/65
6 Claims. (Cl. 346—140)

ABSTRACT OF THE DISCLOSURE

A recording pen comprising upper and lower hollow parts each of which has a projecting beak-like portion at its upper end, with both portions together providing a writing point. The parts are formed so that they fit one partially within the other to provide an ink reservoir and to define a gap between the portions which provides an ink feed channel to the writing point, with an internal capillary feed channel extending between the reservoir and the gap between the beak-like portions.

---

This invention relates to pens, and in particular to recording pens for use with chart recorders. With such a recorder the pen contacts a moving chart to provide a continuous trace thereon, the pen being moved so that its position on the chart is dependent on the variable to be recorded.

A recording pen has to provide an ink reservoir and a writing point for contact with the chart. It is necessary to provide to the point an ink feed channel along which the ink flows, in accordance with variations in the speed of movement of the pen across the chart, by capillary attraction. Pens at present in use are an expensive item due to the individual hand finishing and testing required to ensure a feed channel of satisfactory dimensions to produce the appropriate capillary action. It is normally preferred that the channel should be in the form of a narrow slit, which can be cleaned, rather than a capillary tube which tends to become blocked and is difficult to clear. The object of the invention is to provide a pen in which a satisfactory capillary feed channel can be obtained in a simple and reliable manner.

According to the invention a recording pen comprises two parts each of which has a projecting beak-like portion, both projecting portions together providing a writing point and the parts being so formed that they fit together to define a gap between the portions which provides an ink feed channel to the writing point.

Preferably the parts define between them an ink reservoir and are so formed that the reservoir is in use at a lower level than the writing point with an internal capillary feed channel formed between the parts from the reservoir to the gap between the beak-like portions. Preferably a circular portion of one part fits within the other part with a section of the internal feed channel formed in one part and the remainder in the other part, so that relative rotation of the two parts when fitted together completes the internal feed channel when the beak portions are in register and breaks that channel as the parts are turned. This enables the pen to be supplied readyfilled with ink but with the parts turned to a relative position in which the internal feed channel is broken. With such an arrangement it is necessary not only to turn the parts to the operative position, bringing the beak portions into register and completing the internal supply channel, but also to open a vent which naturally has to be closed during transport of the full pen. A vent may be provided which is closed for transport by means of a suitable plug, or otherwise opened as for example by cutting off a closed-ended tubular projection of one part; alternatively, the vent may be controlled by relative rotation of the parts.

Both parts are preferably moulded from a synthetic plastic material, for example nylon, and the vent may be so arranged that it can be closed by the forefinger as the two parts are pushed fully together. This produces an internal air pressure which forces the ink along the internal feed channel so that it fills the external feed channel between the beak portions, with the result that the pen writes immediately it touches the paper. This overcomes the difficulty with conventional forms of pen that capillary attraction is not effective to supply the writing point until the whole interior of the feed channel has been wetted with ink.

The invention will now be further described with reference to the accompanying drawings which show, by way of example, several forms of pen in accordance with the invention. In the drawings:

FIGURE 1 is of side elevation showing two parts of one pen separated,

FIGURE 2 is a front elevation of the embodiment of FIGURE 1,

FIGURE 3 is a cross section of the embodiment of FIGURE 1 in the operative position, FIGURE 4 is a plan view of FIGURE 3.

Figure 5:
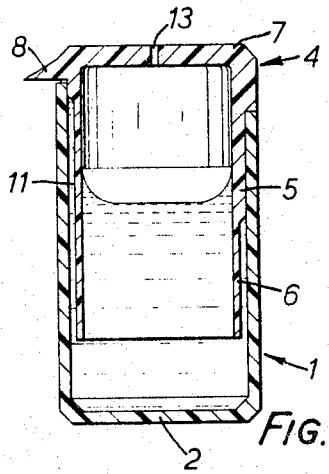
FIGURE 5 is a cross section of the embodiment of FIGURE 1 in the inoperative position.
Figure 6:
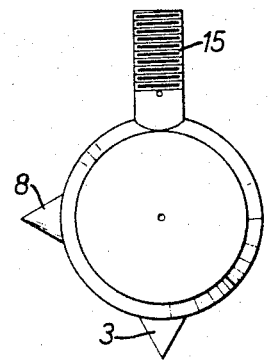
FIGURE 6 is a plan view of FIGURE 5, and FIGURES 7 to 10 each show an alternative embodiment.

With reference to FIGURES 1 to 6, the pen consists of two synthetic plastic mouldings of generally cylindrical shape which fit one within the other in a telescopic manner. The outer moulding 1 is closed at the bottom 2 and at the upper edge has a radial outwardly projecting beak-like portion 3. The inner moulding 4 has a side wall 5 which is a tight sliding fit within the outer moulding 1 and a lower reduced diameter skirt section 6.

At the closed upper end the inner moulding 4 has a radial flange 7 which abuts the upper end of the outer moulding 1 to define the fully fitted position, and from which a further beak-like portion 8 projects. In that position there is a satisfactory gap between flat parallel faces of the projecting portions 3 and 8 so that the gap provides an external capillary feed channel to the writing point at the tip of the beak portions. The beak-like portions 3 and 8 are mirror images one of the other.

The side wall 5 of the inner moulding 4 has a projection 9 which enters a recess 10 in the upper edge of the outer moulding 1 to define the operative relative position of the two mouldings with the beak-like portions 3 and 8 in register. In that position an internal feed channel 11 is provided from the ink reservoir within the two mouldings to the external feed channel between the beak-like portions. The internal feed channel 11 is formed over most of its length by recessing the outer surface of the side wall 5 of the inner moulding 4 to bring it to the skirt diameter, and the channel section so formed terminates a short distance from the upper flange of the inner moulding 4. The internal channel 11 is completed by recessing the inner surface of the outer moulding 1 at the upper edge thereof at 12 in the region of the beak portion 3.

The two mouldings 1 and 4 can be axially displaced to disengage the projection 9 from the recess 10 and then turned, one relatively to the other, to an inoperative position (FIGURE 5) in which the projection 9 engages a further recess 10′ and in which the feed channel 11 does not communicate with the section 12 formed by recessing the outer moulding 1, so that the ink reservoir is completely sealed. The pen can be filled by the manufacturer, and transported or stored, in this condition and the inner moulding 4 turned within the outer moulding 1 to the operative position (FIGURE 3) when the pen is required for use.

A central vent opening 13 for the reservoir is provided in the end wall of the inner moulding 4. For transport and storage when the pen is full the vent hole 13 must be closed in a suitable manner, for example by means of a plug of plasticine or an adhesive cap which can be removed before the pen is put into use.

Figure 7:
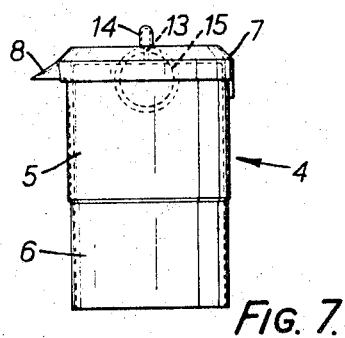

The embodiments illustrated in FIGURES 7 to 10 are generally similar to that already described but have certain modifications. Referring to FIGURE 7, the inner moulding 4 is moulded with a hollow tubular projection 14 which is closed at the outer end and positioned centrally on the end wall of that moulding. This tubular projection 14 can be cut off flush with the end wall to provide a vent hole 13 when the pen is to be used. Thus both the embodiments so far described have a central vent hole 13 which can be sealed temporarily by a finger as the mouldings are pushed fully together to render the pen operative. This pressurises the reservoir and starts the ink flow.

Figure 8:
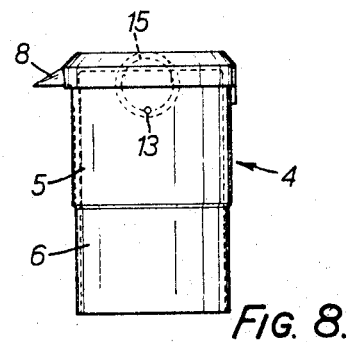

Referring to FIGURE 8, the side wall 5 of the inner moulding 4 has a vent hole 13 slightly spaced from the end flange 7. In the operative position of the mouldings the vent hole 13 communicates with the outer atmosphere through a cut-out in the upper edge of the wall of the outer moulding 1, but is blanked off by that wall in the filled storage position. Thus the vent hole 13 operates, in effect, as a controlled port.

In each embodiment the flange 7 of the inner moulding has a projection enabling the pen to be mounted on the pen arm of a recorder. It may take the form of a screw-threaded projection 15 with a lateral bore through which a mounting wire can be passed and locked in position by a locking ring threaded on the projection. The postion of the mounting projection relatively to the writing point will depend on the application, but for a single pen recorder the mounting projection 15 and the beak portions 2 and 8 will normally project radially at right angles. For a two pen or duplex recorder, the pens may be "handed" so that the writing points are close together, the beak portions being suitably shaped and not projecting generally radially and the mounting projections suitably positioned.

Figure 9:
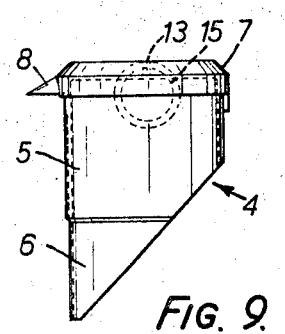
Figure 10:
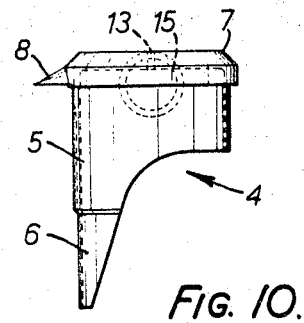

The spacing between the skirt portion 6 of the inner moulding 4 and the wall of the outer moulding 1 provides a capillary feed to the internal feed channel 11. Thus in the region of that channel the skirt portion 6 defines the lowest usable level of the reservoir, but elsewhere it may if desired, together with the side wall 5, be cut away as shown in FIGURES 9 or 10. This reduces the inner moulding 4 where it is not required, and also increases the volume of the ink reservoir for a given size of pen. However, a full skirt portion 6 has the advantage that the inner moulding 4 can be inverted so that it temporarily forms the ink reservoir when filling the pen, and less ink is likely to be expelled when fitting the mouldings together.

I claim:

1. A recording pen comprising an upper part and a lower part that fit one partially within the other in one direction and that define between them an ink reservoir, each of said parts having a projecting beak-like portion, both projecting portions together providing a writing point and overlying each other in said one direction and defining between themselves an ink-feed channel that communicates between said reservoir and said writing point.

2. A recording pen comprising an upper and a lower part each of which has a projecting beak-like portion, both projecting portions together providing a writing point and the parts being so formed that they fit one partially within the other to define a gap between the portions which provides an ink feed channel to the writing point, said upper and lower parts being each of hollow and generally cylindrical form and fitting one partially within the other to provide an ink reservoir, with an internal capillary feed channel extending between the reservoir and the gap between the beak-like portions, a section of the internal capillary feed channel being formed in one said part and the remainder in the other said part, so that relative rotation of the two parts to an operative position in which the beak-like portions define said gap completes the internal feed channel which is broken when the parts are turned from said operative position to an inoperative position.

3. A recording pen according to claim 2, wherein said section of the internal capillary feed channel is formed by a recess in an outer cylindrical surface of said one part, and said remainder of the internal capillary feed channel is formed by a recess in an inner cylindrical surface of said other part.

4. A recording pen comprising an upper and a lower part each of which is moulded from a synthetic plastics material and has a projecting beak-like portion at its upper end, the parts being hollow with cylindrical side walls which fit one within the other enablnig the parts to be relatively rotated between an operative position in which the portions are in register and together provide a writing point and in which a gap between the portions defines an ink feed channel in communication with a reservoir within the parts, and an inoperative position in which the portions are not in register and are sealed from the reservoir.

5. A recording pen according to claim 4, wherein said one part has a vent to admit air to the reservoir which is otherwise closed when the parts are fitted together.

6. A recording pen according to claim 5, wherein the vent is initially opened by cutting off a closed-ended tubular projection on one part.

References Cited

UNITED STATES PATENTS

| | | |
|---|---|---|
| 1,917,572 | 7/1933 | Binckley. |
| 2,063,458 | 12/1936 | Nome. |
| 3,140,912 | 7/1964 | Davis et al. _____ 346—140 |
| 3,278,942 | 10/1966 | Bowditch _____ 346—140 |

FOREIGN PATENTS 29,209   12/1910   Great Britain.

RICHARD B. WILKINSON, *Primary Examiner.*

J. W. HARTARY, *Assistant Examiner.*